United States Patent
Tomikawa et al.

[11] Patent Number: 5,938,864
[45] Date of Patent: Aug. 17, 1999

[54] SLIDING MATERIAL AND SURFACE TREATING METHOD THEREOF

[75] Inventors: Takashi Tomikawa; Toshihiko Kira; Soji Kamiya, all of Toyota, Japan

[73] Assignee: Taiho Kogyo Co., LTd., Aichi, Japan

[21] Appl. No.: 08/732,348

[22] PCT Filed: Feb. 15, 1996

[86] PCT No.: PCT/JP96/00326

§ 371 Date: Aug. 6, 1997

§ 102(e) Date: Aug. 6, 1997

[87] PCT Pub. No.: WO96/27685

PCT Pub. Date: Dec. 9, 1996

[30] Foreign Application Priority Data

Mar. 3, 1995 [JP] Japan .................................. 7-043918

[51] Int. Cl.$^6$ .............................. C22C 9/06; C23C 18/00
[52] U.S. Cl. ..................... 148/435; 148/434; 148/687; 420/485; 420/487; 428/545
[58] Field of Search ...................... 420/485, 487; 75/226, 231, 246, 247; 252/12.2, 12, 12.4, 12.6; 428/138, 553, 545; 148/435, 434, 687

[56] References Cited

U.S. PATENT DOCUMENTS

| | | | |
|---|---|---|---|
| 4,308,153 | 12/1981 | Mori | 252/12.2 |
| 4,641,976 | 2/1987 | Kar | 384/95 |
| 5,091,098 | 2/1992 | Tanaka et al. | 252/12.2 |

FOREIGN PATENT DOCUMENTS

| | | |
|---|---|---|
| 271341 | 8/1989 | Germany . |
| 50-081915 | 7/1975 | Japan . |
| 53-060308 | 5/1978 | Japan . |
| 57-076142 | 5/1982 | Japan . |
| 63-133027 | 6/1987 | Japan . |
| 5-326764 | 12/1993 | Japan . |

*Primary Examiner*—Sikyin Ip
*Attorney, Agent, or Firm*—Armstrong, Westerman, Hattori, Mcleland & Naughton

[57] ABSTRACT

A copper alloy material excellent in the resistance to corrosion caused by lubricating oils containing sulfur-based additives. The alloy comprises from over 5 to 50% Ni, 0.1–2% Ag and the balance consisting substantially of Cu, and optionally contains at least one member selected among (1) up to 20% Sn, up to 0.5% P, up to 5% Al, up to 1% Si, up to 5% Mn, up to 30% Zn, up to 10% Fe and/or up to 1% Sb, (2) up to 30% in total of Pb and/or Bi, (3) up to 30% in total of graphite $MoS_2$. $WS_2$ and/or BN, (4) up to 20% in total of $Al_2O_3$, SiC, $SiO_2$. $Fe_3P$, AlN, $Si_3N_4$, TiC, WC, BN, NiB and/or FeB, and (5) 0.001–1% S.

19 Claims, 1 Drawing Sheet

SLIDING MATERIAL AND SURFACE TREATING METHOD THEREOF

TECHNICAL FIELD

The present invention relates to a copper-based sliding material, more particularly to the sliding material for such parts used under the lubrication of a lubricating oil which contains sulfur-based additives, such as a bush or washer of a transmission, a piston-pin bush, a cam bush, a balancer bearing (bush metal) or various parts of a turbo-charger, i.e., a floating bush, a thrust washer or the like. The present invention also relates to these parts.

BACKGROUND TECHNIQUE

Heretofore, lead bronze or phosphorus bronze has been used as the above-mentioned sliding materials. In addition, proposals have been made to enhance the seizure resistance of these copper alloys, such as by adding the matrix-strengthening elements, such as P, Al and the like, or adding Bi or the like which has good compatibility. These proposals have achieved some success.

However, when the lead bronze or phosphorus bronze is used in the lubricating oil having a high sulfur content and at a high temperature, black copper sulfide is formed on the surface. Since this copper-sulfide layer is of low-strength and is not tightly bonded to the substrate, such layer easily peels off from the substrate. It has consequently, turned out that seizure or abnormal wear thus occurs. Furthermore, it has also turned out that the copper alloys are corroded by the sulfur components of the lubricating oil, which leads to decrease in strength of the material and hence accelerates fatigue. In addition, the seizure of the lead bronze and the phosphorus bronze has been readily incurred under such sliding condition which brings about a mixture or boundary lubrication due to the small amount of lubricating oil.

Engine oil, transmission oil, gear oil or the like are the lubricating oil which lubricates between the above-mentioned sliding materials and the opposite material. The sulfur-based additives are added to these oils.

First, the additives to the gasoline-engine oil are dialkylmonosulfide for preventing the oxidative deterioration of the engine oil, a sufonate- or phenate- base metal detergent agent for cleaning the sludge formed by oxidation of the engine oil, dithiophosphate molybdenum compound or dithiocarbamate molybdenum compound for preventing foaming of the low-viscosity engine-oil, or the like. The above-mentioned dialkylmonosulfide is believed to ionically decompose the hydroperoxide which is formed by the oxidation of the base oil. However, detrimental effects of the additives are also pointed out. For example, the metal-based detergent agent forms sulfate-ash or sludge. The amount of its use is therefore limited. In addition, it is said that the foaming-preventing agent may exert a detrimental effect on the performance of the bearing metal.

ZnDTP (dialkyldithiozincphosphate) is added to the diesel-engine oil as a countermeasure against the wear due to soot. Into the rotary-engine oil, olefin sulfide, sulfurized oil or the like is added as the sulfur-based extreme pressure agent, and thiozinc-phosphate, dithiocarbamate molybdenum sulfide is added as the organic-metal anti-wear agent.

Into the transmission oil and the gear oil, olefin sulfide, sulfurized oil or the like is added as the sulfur-based extreme pressure agent, and thiozinc-phosphate or dithiocarbamate molybdenum sulfide is added as the organic-metal anti-wear agent, phosphate-esteramino-salt as the phosphorus-base anti-wear agent. The sulfur concentration ranges from 0.37 to 1.7% in the commercially available oil at present.

It is known that, when the above-mentioned various oils deteriorate, the oil incurs corrosion problems in the copper-based sliding materials. As a corrosion countermeasure, the present applicant filed the following patent applications.

U.S. Pat. No. 4,878,768: The deteriorated oil causes the corrosion of the Pb phase present in the clearances between the skeleton of the Cu—Pb based sintered alloy used as a sliding bearing of a diesel engine. In order to prevent such corrosion, In is added to the Pb phase.

Japanese Unexamined Patent Publication No. 7-118,777: sintered copper-alloy-based composite sliding member, which is based on the sintered copper alloy consisting of more than 15% and up to 40% of Zn, from 0.5 to 6% of graphite, and from 0.5 to 6% of one or more of $Al_2O_3$, $SiO_2$ and $Fe_3P$, and the balance being Cu. In this application, Zn is added in the above-mentioned amount to prevent the corrosion which results from the fact that the deteriorated transmission oil forms CuS on the surface of the copper alloy.

The present inventors carried out a sliding test of a copper-based sliding material, in which the lubricating oil with the above-mentioned sulfur-based additives was used, and which almost wholly reproduces the usage conditions of an actual machine. It was then recognized that the total acid value of the lubricating oil (diesel-engine oil, CD grade, 10W-30) greatly increased as follows.

|  | Time | | | | |
| --- | --- | --- | --- | --- | --- |
|  | 0 (h) | 50 (h) | 100 (h) | 150 (h) | 220 (h) |
| Total acid number (mg KOH/g) | 1.3 | 6.4 | 18.0 | 21.5 | 22.3 |
| Strong acid number (mg KOH/g) | 0 | 0 | 0.1 | 0.2 | 0.3 |
| Total base number mg KOH/ | 3.8 | 0.5 | 0 | 0 | 0 |

The conventional Kelmet and the copper-based sliding materials proposed by the present inventors exhibit unsatisfactory corrosion resistance in the deteriorated lubricating oil. The usage environment of sliding bearings, particularly, a piston-pin bush, a bush of automatic transmission or the like, is under increasing severity, which incurs the reaction between the copper and sulfur in the lubricating oil leading to formation of copper sulfide. The wear is aggravated, therefore. Further, because of considerable temperature-rise, the oil-film is cut on the sliding parts and the seizure problem arises.

The conventional lead bronze or phosphorus bronze does not corrode due to sulfur, when the lubricating oil is free of the sulfur-based additive or the amount of its addition is low. Enhancement of the seizure resistance of these bronzes is desired, however, even in such case.

It is an object of the present invention to provide a copper-based sliding material, which has improved resistance against the lubricating oil to which a sulfur-based additive has been added and which has been deteriorated due to use.

It is also another object of the present invention to enhance the seizure resistance of the copper-based sliding material which is lubricated by the lubricating oil which is free of the sulfur-based additives or in which the addition amount of the sulfur-based additive is small.

It is, furthermore, an object of the present invention to provide a surface treatment method which has an object to enhance the corrosion resistance of the copper-based sliding material against the deteriorated lubricating oil.

DISCLOSURE OF INVENTION

The present inventors made research to improve the corrosion resistance of the copper-based sliding material from the above points of view. The present inventors discovered then that, when the copper with an adequate amount of Ni and a small amount of Ag is caused to slide under the condition of deteriorated lubricating oil with the sulfur-based additive, Ni suppresses the copper from being sulfurized, and Ag and S concentrate on the copper surface and then form a protective layer which remarkably enhances the corrosion resistance.

In addition, the present inventors discovered that the seizure resistance is remarkably enhanced by adding Ni and a small amount of Ag and S to the copper alloy.

The sliding material thus proposed by the present invention consists of, by weight percentage, more than 5% and not more than 50% of Ni, from 0.1 to 2% of Ag, and the balance being essentially Cu, and has improved corrosion resistance against the sulfur-based additive contained in the lubricating oil (the composition of the copper alloy hereinafter is based on weight percentage). This alloy is hereinafter referred to as "Ni—Ag additive copper alloy".

Another sliding material according to the present invention consists of more than 5% and not more than 50% of Ni, from 0.1 to 2% of Ag, from 0.001 to 1% of S and the balance being essentially Cu, and has improved seizure resistance. This alloy is hereinafter referred to as "Ni—Ag—S additive copper alloy".

These copper alloys according to the present invention may be embodied as the following materials with additives to further improve the sliding properties.

(1) A copper alloy, in which one or more of the following elements are added.
Sn: not more than 20%
P: not more than 0.5%
Al: not more than 5%
Si: not more than 1%
Mn: not more than 5%
Zn: not more than 30%
Fe: not more than 10%
Sb: not more than 1%

(2) A copper alloy, in which one or more of Pb and Bi are added in the total amount of not more than 30%.

(3) A composite sintered material of a solid lubricant and copper-alloy powder. The solid lubricant is one or more of graphite, $MoS_2$, $WS_2$ and BN in the total amount of not more than 30% by weight percentage, and the copper-alloy powder is the balance and is not less than 70%.

(4) A composite sintered material of a hard additive and copper-alloy powder. The hard additive is one or more of $Al_2O_3$, SiC, $SiO_2$, $Fe_3P$, AlN, $Si_3N_4$, TiC, WC, BN, NiB and FeB in the total amount of not more than 20% by weight percentage, and the copper-alloy powder is the balance and is not less than 80%.

(5) A copper based sliding material, which is sintered material on a metal backing and resin is impregnated in the pores of the sintered material.

(6) A copper based sliding material, which is sintered material on a metal backing and resin is impregnated in the pores of the sintered material and, further, the surface of the sintered material is covered by said resin.

In addition, there is provided a surface treatment method according to the present invention, in which the sliding materials according to the present invention are brought into contact with lubricating oil which contains from 0.3 to 3% by weight of a sulfur-based additive in terms of sulfur concentration, and which has the total acid number of not less than 5 mg KOH/g and, subsequently, the sliding materials are mounted in a sliding apparatus.

The present invention is described hereinafter in detail.

First, in the Ni—Ag additive copper alloy according to the present invention, Ni is a component which is solid-dissolved in the matrix of the copper alloy and suppresses its sulfurization. When the Ni content is 5% or less, its effects are slight, while at more than 50% the coefficient of friction of the copper alloy becomes so high that the wear becomes liable to occur and, further the seizure resistance is lowered. The Ni content is, therefore, preferably more than 5% and not more than 50%, more preferably from 7 to 30%.

The Cu—Ni alloy samples, the Ni content of which was varied, were immersed for 24 hours in the gear oil (S content: approximately 0.65%) at a temperature of 180° C. The X-ray diffractiometry of the sample surface was then carried out to measure the peak intensity of the $Cu_2S$ peak. The measuring results are shown in Table 1.

TABLE 1

| Ni content (wt %) | X-ray peak intensity (cps) |
|---|---|
| 0 | 400 |
| 4 | 260 |
| 5 | 90 |
| 10 | 30 |
| 20 | 10 |
| 30 | 0 |
| 40 | 0 |
| 50 | 0 |

As is apparent from Table 1, when 5% or more of Ni is added to the copper alloy, $Cu_2S$, which is formed by the reaction with S in the gear oil, drastically decreases. This reason seems to be attributable to the fact that: the solute Ni of Cu increases the activity of Cu with the increase in the Ni addition amount; higher energy is necessary for the reaction between the Cu, the activity of which is increased, and S; and, further, the sulfide-formation reaction becomes difficult to occur. For such reasons, the reaction between Cu and S seems to be more difficult to occur with the increase in the Ni addition amount.

Ag is an element which is solid-dissolved in the matrix of the copper alloy and enhances the seizure resistance of the copper alloy. The effects of Ag become pronounced particularly under the lubricating condition of a sliding material, where the sliding condition shifts from the fluid-lubrication to a boundary lubrication and hence the seizure is liable to occur. In addition, the solute Ag, which is uniformly dissolved in the matrix, is caused to react with sulfur of the sulfur-based additive and, hence, to form an Ag—S concentrated layer, thereby significantly enhancing the corrosion resistance. On the other hand, fine Ag particles, which constitute the CuAg eutectic, also form partly the Ag—S concentrated layer, although not actively as the solute Ag.

Consequently, when the copper-based sliding material with the Ag addition is used in the deteriorated lubricating oil, the concentrated layer of Ag and S is formed on the sliding surface due to friction heat and the sulfur-based acid formed due to deterioration and friction heat. When the surface of the inventive material is analyzed after the sliding by SIMS (Secondary Ion Mass Spectroscopy) method to determine the Ag concentrated regions and the S concentrated regions, then, these regions are found to be virtually coincident with one another. It can, therefore, be confirmed that Ag and S concentrate in the same locations of the tested material. Since the Ag and S concentrations in such concentrated layer are considerably higher than those in the matrix, the detection of Ag and S by analysis is easy. Since this concentrated layer is of approximately 0.2 $\mu$m thickness at the most and is hence very thin, identification of the material structure is difficult. It seems, however, that the silver sulfide is formed and, further, the Cu is diluted to the concentration of approximately 50% or less.

When Ag is less than 0.1% in the Ni—Ag additive alloy and the Ni—Ag—S additive alloy according to the present invention, there is no significant formation of the Ag—S concentrated layer. On the other hand, when the Ag content exceeds 2%, the Ag precipitated phases formed in the Cu matrix are so coarsened and the distribution of Ag on the sliding surface becomes non-heterogeneous so that the effects of Ag addition diminish. Ag, is therefore, preferably in a range of from 0.1 to 2% in the present invention. The more preferable Ag content is from 0.2 to 1.5%. The most preferable Ag content is from 0.5 to 1.0%.

The Ag—S concentrated layer is not appreciably formed at the time the lubricating oil is fresh. When the lubricating oil deteriorates, the reaction between the sulfur-based acid formed by the deterioration and the copper alloy, i.e., the corrosion, starts. The sites, where the Ag—S concentrated layer is formed, and the sliding sites, where the corrosion is likely to occur, coincide therefore to one another. The Ag—S concentrated layer stably exists on the sliding surface, notwithstanding the friction of the copper alloy and the opposite member. That is, its dissolution into the lubricating oil, mechanical separation from the sliding surface, and growth from the sliding surface toward the inside virtually do not occur. In addition, decomposition into Ag and S virtually does not occur. The corrosion in the deteriorated oil is suppressed.

The elements other than Ag, which have some affinity to S, such as Zn and Pb, each form the concentrated layer which is stable as above and has the above-described functions. When the corrosion occurs at sites different from those where the Ag—S concentrated layer is once formed, the Ag—S concentrated layer is formed in such corrosion sites. The Ag—S concentrated layer is formed locally on any sites where the corrosion is likely to occur, while such layer is not formed on sites where the corrosion does not occur.

The balance of the above composition is impurities ordinarily contained in the copper, such as Fe, S, O and the like. The purity of copper may be such as that which tough-pitch copper, electric copper, electrolytically refined copper, and OFHC (Oxygen Free High Conductivity Copper) have. S, which is permissible as an impurity in the Ni—Ag additive copper alloy, is insoluble in Cu and is, therefore, present as the Cu—S minority phase.

The base oil of the lubricating oil, to which the present invention can be applied, is not limitative at all but contains sulfur-based additive(s). The sulfur-based additives are such compounds as (poly)sulfide, sulfonate, sulfinate, sulfenate, the phenate given below, (di)thiophsphate compound, thioketone, thioacetal, thiocarbonic acid and its derivative (s), sulfoxide and its derivative(s), sulfonyl, sulfinyl, sulfenyl, and ZnDTP.

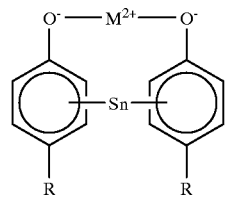

Each of these organic-acid compounds decomposes at 100–160° C., which is the sliding temperature, into the corrosive sulfuric acid or its equivalent matter, and forms the Ag—S concentrated layer due to reaction of this acid and the surface of the copper alloy.

The addition amount of the sulfur-based additive of the lubricating oil, which lubricates the Ni—Ag additive copper alloy, is not particularly limited and may be any level at which the intended purposes, such as the oxidation prevention, can be attained. The sulfur-based additive in such amount does not corrode the copper alloy but forms during sliding the corrosive sulfur-compound. Its concentration so increases as to form the Ag—S concentrated layer. Although use of the addition of the sulfur-based addition in high concentration has been restrained, it is noted that such additive can be made without problem.

In the Ni—Ag—S additive copper alloy, since S forms the Ag—S concentrated layer as described hereinafter, there is no need to add the sulfur-based additive to the lubricating oil, or its content may be so small as 0.3% or less in terms of sulfur.

Ni, which is contained in the Ni—Ag—S additive copper alloy, is solid-dissolved in the matrix of the copper alloy and impedes a sulfurizing and corrosive reaction between Cu and S, i.e., one of the components of the alloy, and hence increases S, a state of which is capable of bonding with Ag. When the Ni content is 5% or less, its effects are slight. On the other hand, when the Ni content exceeds 50%, the coefficient of friction of the copper alloy is so lowered as to make the wear liable to occur and lessen the seizure resistance. The Ni content is, therefore, preferably more than 5% and 50% or less, more preferably from 7 to 30%.

S, which is added in the Ni—Ag—S additive copper alloy according to the present invention as an alloying element, forms the Ag—S concentrated layer. Namely, when 0.001% or more of S is preliminarily added to the copper-alloy material, Ag and S bond on the sliding surface due to the friction heat during sliding, and the Ag—S concentrated layer thinly covers the surface. The Ag—S concentrated layer retards the formation of CuS and exhibits as itself good sliding performance, with the result that the seizure resistance is improved. When the S content exceeds 0.5%, however, the strength of the copper alloy is considerably lessened, which is not preferable. The preferred S content is from 0.005 to 1%.

When the Ni—Ag—S additive copper alloy is used in the lubricating oil, which contains the sulfur-based additive, the Ag—S concentrated layer exhibits improved corrosion resistance against the deteriorated lubricating oil.

In order to exhibit the functions of the component elements of the inventive alloys, sintering, casting or casting followed by annealing may be carried out. In order to provide the shape of parts, the plastic working and/or machining may be appropriately carried out.

In the present invention, provided that such elements as those which impair the functions of the above-mentioned additive elements, such as Ca which is extremely liable to bond with S, are not added, other elements may be added to enhance the sliding performances as follows. Sn, P, Al, Si, Mn, Zn, Fe and Sb strengthen the Cu matrix and enhance the seizure resistance and wear resistance. Si and Mn form an intermetallic compound with one another and enhance the seizure resistance and wear resistance. P decreases the concentration of solute oxygen by deoxidizing and seems to strengthen the functions of Ag and S. However, when S exceeds 20%, P exceeds 0.5%, Al exceeds 5%, Si exceeds 1%, Mn exceeds 5%, Zn exceeds 30%, Fe exceeds 10%, and Sb exceeds 1%, the ductility, which is an inherent property of Cu, is impeded. The upper limits must, therefore, be applied to these values. Preferable contents are: 1–10% of Sn; 0.2–0.4% of P; 1–5% of Al; 0.1–1.5% of Si; 1–3% of Mn; 1–2% of Cr; 1–5% of Ni; 1–2% of Mg; 15–25% of Zn; and, 0.1–3% of Sb.

Pb and Bi are elements which enhance the compatibility and embedding property of foreign matters. Since these elements are present in the Cu matrix as the secondary-phase particles, they are not preferentially present on sites where the adhesive wear is likely to occur. Contrary to this, the Ag—S concentrated layer of the present invention is formed after the deterioration of the lubricating oil starts or the temperature of the sliding part becomes high due to friction, the Ag—S concentrated layer is formed on the sites where the seizure is liable to occur, but its effects are not readily apparent. The Ag—S concentrated layer is formed on sites where the adhesive wear is likely to occur. Therefore, when Pb or Bi as well as Ag and S are copresent, improved sliding performances may be realized from the start of the use of the sliding member until after a considerable period of use has elapsed.

Each of the Ag—Pb and Ag—Bi binary alloys forms an eutectic-type phase diagram having an eutectic point at a low Ag-concentration region. When the Ag additive amount is approximately 0.1% or more, Ag is present in the eutectic crystals of the practical alloys as well. However, when the sites where the adhesive wear is likely to occur is analyzed, Ag is not concentrated in the eutectic crystals but is concentrated in a considerably broader region than the eutectic structure and Ag and S are together concentrated.

Graphite, $MoS_2$, $WS_2$ and BN, which are added as the complex component, to the sliding material according to the present invention, are solid lubricants which prevent the seizure from occurring due to their lubricating effect, retard the formation point of the Ag—S concentrated layer and prolong the life of the sliding material. However, when the additive amount of the solid lubricant exceeds 30% in total, the strength of the sintered alloy decreases. The preferable adding content is from 10 to 20%.

$Al_2O_3$, SiC, $SiO_2$, $Si_3N_4$, $Fe_3P$, AlN, TiC, WC, BN, NiB and/or FeB are each hard materials and enhance the wear resistance. When the additive amount exceeds 20%, the strength of the sintered alloy decreases. More preferable additive content is from 5 to 12%.

When the copper-based sliding material according to the present invention is rendered in the form of sintered material, the sintering pores are preferably impregnated with resins. The impregnating resin which can be used is almost all resin used as the sliding material, preferably PI (polyimide), PAI (polyamide imide), PEI (polyetherimide), PEEK (polyetherketone), aromatic PA (polyamide), phenol resin, epoxy resin, PTFE (polytetrafluoroethylene), and fluorine resin (PFA (copolymer of tetrafluoroethylene perfluoroalkylvinylether), ETFE (copolymer of tetrafluoroethylene-ethylene), and FEP (copolymer of tetrafluoroethylene-hexafluoropropylene)). The amount of resin is preferably from 30 to 80% by weight, more preferably from 40 to 60% by weight. Porosity of the sintered material is preferably from 70 to 20%, preferably from 60 to 40 wt %.

Powder, which is used for the production of the inventive sintered copper alloy containing Ni and Ag, and further containing if necessary other elements, is preferably manufactured by an ingot-crushing method or atomizing method. In the case of the ingot-crushing method an ingot is cooled from the temperature of 700° C. or higher at a cooling speed of 20° C./minute or more, thereby making it possible to solid-dissolve as much as possible of Ag in the powder and to disperse the non solid-dissolved Ag as fine particles. When the copper-alloy liquid is cooled at a high speed of 1000° C./second or more, the Ag of the atomized powder can be solid-dissolved and finely dispersed as well.

When the Ni—Ag additive copper alloy and the Ni—Ag—S additive copper alloy according to the present invention are preliminarily surface treated, then the Ag—S concentrated layer can be formed. Namely, the sliding material is brought into contact with the lubricating oil at a temperature of not less than 80° C., which oil contains from 0.3 to 3% by weight of the sulfur-based additive in terms of sulfur concentration, and which has the total acid number of not less than 5 mg KOH/g, and, subsequently the sliding material is mounted in a sliding apparatus. Stable corrosion resistance can thus be obtained. The total acid value herein is measured under JISC 2101. 100 ml of the mixing solvent is added to 20 g of the lubricating oil. Neutralization titration is then carried out using the N/20 potassium hydroxide standard solution as the alkaline titrant and Alkali Blue 6B as the reagent. The total acid value is expressed by the amount (mg) of the N/20 potassium hydroxide required for the neutralization.

The above-described method resides in that the corrosion resistance is improved by utilizing the stability of the corrosion resistance in the context described above. Incidentally, the sulfur-based additive used in this method may not directly contribute to enhance the performance of an engine or the like, such as preventing the sludge or the like. Preferable contacting condition is from 100 to 150° C. and from 30 minutes to 24 hours.

BEST MODE FOR CARRYING OUT THE INVENTION

Figure 1:
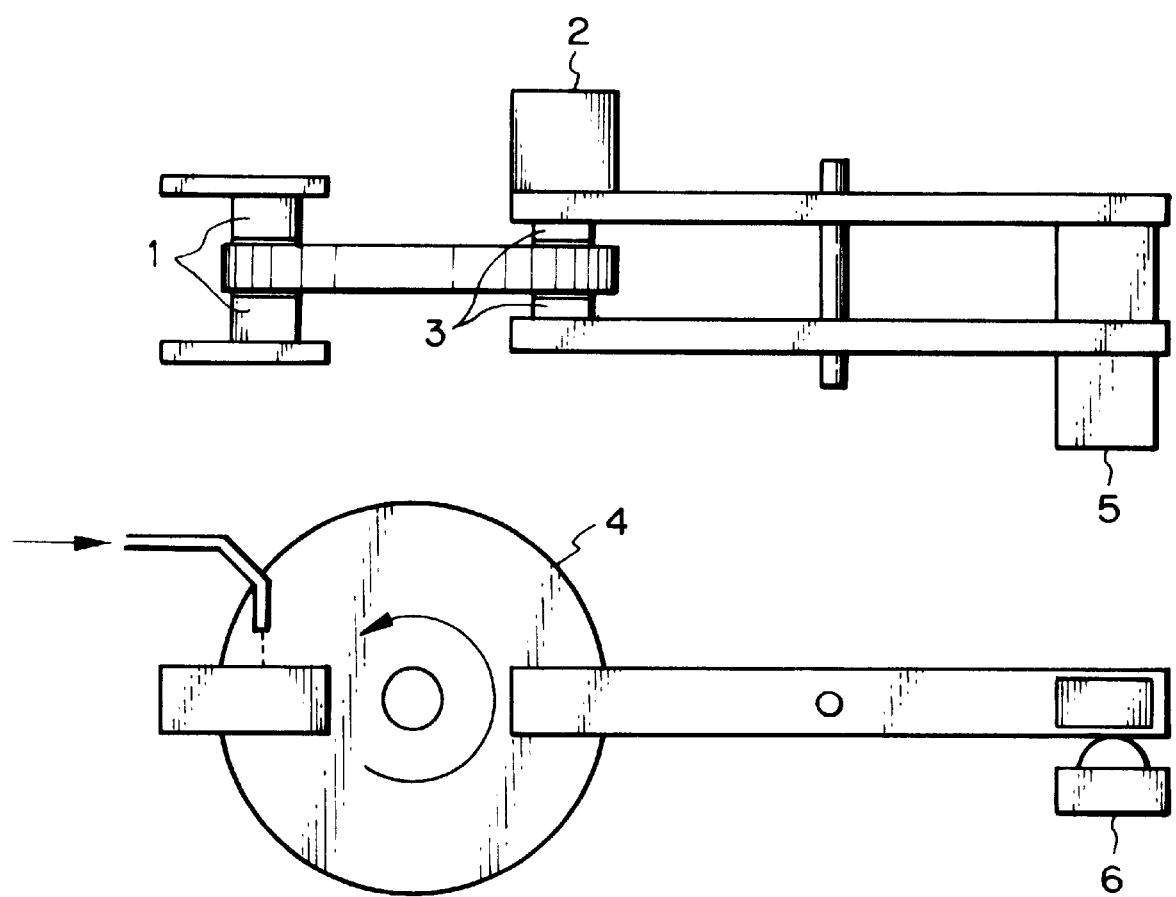
FIG. 1 is a drawing showing the seizure tester.

The testing method for investigating the seizure resistance in the example is as follows.

A tester: As shown in FIG. 1.
Sliding Speed: 15 m/s
Load: Gradual increase of load (step mode), 50 kgf/10 minutes
Kind of oil: 10W-30 CC grade (S content—0.5%)
Temperature of oil: Room temperature
Opposed material: hardened S55C (Hv 550–650), roughness—0.5–0.8 μm Rz
In FIG. 1: 1—oil-feeding pad; 2—hydraulic cylinder; 3—a test piece; 4—a disc; 5—a balance weight; and 6—a load cell.

The results are shown in Table 2.

TABLE 2

| | Composition of Copper Alloy (Weight %) | | | | | | | | | | | Additive (Weight %) | | | Peak Intensity of Cu₂S (cps) | Seizure Load (Kg/cm²) |
|---|---|---|---|---|---|---|---|---|---|---|---|---|---|---|---|---|
| Cu | Ni | Ag | Sn | P | Al | Zn | Fe | Sb | Cr | Si | others | Solid Lubricant | Hard Material | Resin | | |
| 1 Bal | 5 | 1 | — | — | — | — | — | — | — | — | — | — | — | — | 82 | 900 |
| 2 Bal | 50 | 0.5 | — | — | — | — | — | — | — | — | — | — | — | — | 0 | 750 |
| 3 Bal | 15 | 0.2 | 5 | 0.1 | — | 3 | 2 | — | — | — | Pb = 5 | — | — | — | 0 | 700 |
| 4 Bal | 20 | 2 | — | — | 2 | 20 | — | 0.3 | 1 | 1 | Mn = 2 | — | — | — | 13 | 750 |
| 5 Bal | 30 | 0.05 | 10.0 | 0.5 | — | — | 2 | — | — | — | Bi = 2 | Graphite:10 | Al₂O₃:5 | — | 0 | 950 |
| 6 Bal | 15 | 1 | 5 | — | — | 10 | 5 | — | — | — | — | — | — | PI:20 | 0 | 900 |
| 7 Bal | 10 | 1 | — | — | — | — | 3 | — | — | — | Pb = 5 | MOS₂:20 | AlN:10 | PH:30 | 10 | 1050 |
| 8 Bal | 15 | 0.1 | 5 | — | — | — | 3 | — | — | — | — | Graphite:30 | — | — | 38 | 950 |
| 9 Bal | 10 | 1 | — | — | — | — | 10 | — | — | — | — | — | Fe₃P | — | 29 / 35 | 950 / 850 |
| 10 Bal | 20 | 1 | 3.0 | 0.1 | — | 20 | 5 | — | — | — | — | Graphite:10 | Al₂O₃:5 | PI:30 | 13 | 1100 |
| 11 Bal | 10 | 1 | — | — | — | — | — | — | — | — | Pb = 30 / S = 0.01 | — | — | — | 27 | 1050 |
| 12 Bal | — | — | 10 | — | — | — | — | — | — | — | Pb = 10 | — | — | — | 430 | 450 |
| 13 Bal | 4 | 1 | — | — | — | — | — | — | — | — | — | — | — | — | 238 | 900 |
| 14 Bal | 20 | 0.05 | — | — | — | — | — | — | — | — | — | — | — | — | 16 | 400 |
| 15 Bal | 55 | 1 | — | — | — | — | — | — | — | — | — | — | — | — | 0 | 450 |
| 16 Bal | 10 | 0.5 | — | — | — | — | — | — | — | — | — | — | Al₂O₃:25 | — | 18 / 12 | 350 / 300 |

EXAMPLE 2

The inventive material 3 and the comparative material 14 of Table 2 were worked into a piston bush of a connecting rod, and mounted in the engine of an actual vehicle. The running test was carried out for 30000 km. The engine oil used was of 7.5W-30 SE grade and its S content was 1.5%. The estimated highest temperature during use was 150–200° C. The engine oil was not replaced during the running period.

The surface of the bushes, for which the inventive material was used, was a metallic-copper color even after using, while the surface of bushes, to which the comparative material was used, changed to black. The wear amount of the former was 2.5 times as high as that of the latter.

Industrial Applicability

As is described hereinabove, the copper-based sliding material according to the present invention has improved sulfurizing corrosion-resistance against the sulfur contained in the lubricating oil and, moreover, has improved seizure resistance over that of the conventional lead bronze and phosphorus bronze. The material according to the present invention is, therefore, epoch-making. The copper-based sliding material according to the present invention, is therefore, particularly suited for various parts as explained at the beginning of the present application.

We claim:

1. A sliding material consisting of a copper-alloy having improved corrosion resistance against a sulfur-based additive contained in lubricating oil, wherein said alloy consists of, by weight percentage, more than 5% and not more than10% of Ni, from 0.1 to 2% of Ag, optionally one or more of Pb and Bi in the total amount of not more than 30%, and the balance being Cu and impurities, said alloy forming an Ag—S concentrated layer on a sliding surface of the alloy when exposed to a sulfur-based additive.

2. A sliding material according claim 1, wherein the Ni content is from 7 to 10%, and the Ag content is from 0.5 to 1%.

3. A sliding material consisting of a copper alloy having improved corrosion resistance against a sulfur-based additive contained in lubricating oil, wherein said alloy consists of, by weight percentage, more than 5% and not more than 10% of Ni, from 0.1 to 2% of Ag, and, one or more of
Sn: not more than 20%,
P: not more than 0.5%,
Al: not more than 5%,
Si: not more than 1%,
Mn: not more than 5%,
Sb: not more than 1%,
the balance being Cu and impurities,
   said alloy forming an Ag—S concentrated layer on a sliding surface of the alloy when exposed to a sulfur-based additive.

4. A sliding material according to any one of claim 1 or 2, wherein said copper alloy further contains, by weight percentage, one or more of Pb and Bi in the total amount of not more than 30%.

5. A sliding material which is a sintered material of a solid lubricant and powder of the copper-alloy according to any one of claim 1 or 2, wherein the solid lubricant is one or more of graphite, MoS₂, Ws₂, and BN in the total amount of not more than 30% by weight percentage, and the powder of the copper alloy is the balance and is not less than 70%.

6. A sliding material which is a sintered material of a hard additive and powder of the copper-alloy according to any one of claim 1 or 2, wherein the hard additive is one or more of Al₂O₃, SiC, SiO₂, Fe₃P, AlN, Si₃N₄, TiC, WC, BN, NiB and FeB in the total amount of not more than 20% by weight percentage, and the copper-alloy powder is the balance and is not less than 80%.

7. A sliding material, which is the copper-based sliding material according to any one of claim 1 or 2 sintered on a metal backing and, further, resin is impregnated in the pores of the sintered material.

8. A sliding material according to claim 7, wherein the proportion of said resin is from 30 to 80% by weight.

9. A sliding material according to claim 7, wherein the surface of the sintered material is covered by said resin, with which the sintered material is impregnated.

10. A sliding material consisting of a copper-alloy having improved corrosion resistance against a sulfur-based additive contained in lubricating oil, said alloy consisting of, by weight percentage, more than 5% and not more than 10% of Ni, from 0.1 to 2% of Ag, from 0.001 to 1% of S, optionally one or more of Pb and Bi in the total amount of not more than 30%, and the balance being Cu and impurities.

11. A sliding material according to claim 10 wherein the Ni content is from 7 to 10%, the Ag content is from 0.5 to 1% and the S content is from 0.001 to 1%.

12. A sliding material consisting of a copper alloy having improved corrosion resistance against a sulfur-based additive contained in lubricating oil, wherein said alloy consists of, by weight percentage, more than 5% and not more than 10% of Ni, from 0.1 to 2% of Ag, from 0.001 to 1% S, one or more of
Sn: not more than 20%,
P: not more than 0.5%,
Al: not more than 5%,
Si: not more than 1%,
Mn: not more than 5%,
Sb: not more than 1%,
the balance being Cu and impurities, said alloy forming an Ag—S concentrated layer on a sliding surface of the alloy when exposed to a sulfur-based additive.

13. A sliding material according to any one of claim 10 or 11, wherein said copper alloy further contains, by weight percentage, one or more of Pb and Bi in the total amount of not more than 30%.

14. A sliding material which is a sintered material of a solid lubricant and the copper-alloy powder according to any one of claim 10 or 11, wherein the solid lubricant is one or more of graphite, $MoS_2$, $WS_2$ and BN in the total amount of not more than 30% by weight percentage, and the copper-alloy powder is the balance and is not less than 70%.

15. A sliding material which is a sintered material of a hard additive and powder of the copper-alloy according to any one of claim 10 or 11, wherein the solid lubricant is one or more of $Al_2O_3$, SiC, $SiO_2$, $Fe_3P$, AlN, $Si_3N_4$, TiC, WC, BN, NiB and FeB in the total amount of not more than 20% by weight percentage, and the copper-alloy powder is the balance and is not less than 80%.

16. A sliding material which is the copper-based sliding material according to any one of claim 10 or 11 sintered on a metal backing and resin is impregnated in the pores of the sintered material.

17. A sliding material according to claim 16, wherein the proportion of said resin is from 30 to 80% by weight.

18. A sliding material according to claim 16, wherein the surface of the sintered material is covered by said resin, with which the sintered material is impregnated.

19. A surface treatment method, comprising mounting the sliding material according to any one of claims 1, 2, 10 or 11, in a sliding apparatus, and then contacting the sliding material with the lubricating oil which contains from 0.3% to 3% by weight of the sulfur-based additive in terms of sulfur concentration, and which has the total acid number of not less than 5 mg KOH/g.

* * * * *